(12) United States Patent
Buck, Jr. et al.

(10) Patent No.: US 11,250,688 B2
(45) Date of Patent: Feb. 15, 2022

(54) SYSTEMS AND METHODS FOR MONITORED INDIVIDUAL PROGRESSION PROCESSING

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 16/221,498

(22) Filed: Dec. 15, 2018

(65) Prior Publication Data

US 2019/0206222 A1    Jul. 4, 2019

Related U.S. Application Data

(60) Provisional application No. 62/612,650, filed on Jan. 1, 2018.

(51) Int. Cl.

| | |
|---|---|
| *G08B 25/01* | (2006.01) |
| *G08B 21/22* | (2006.01) |
| *H04W 4/029* | (2018.01) |
| *G06Q 50/26* | (2012.01) |
| *G08B 25/10* | (2006.01) |
| *G08B 21/02* | (2006.01) |

(Continued)

(52) U.S. Cl.
CPC ....... *G08B 25/016* (2013.01); *G01C 21/3461* (2013.01); *G01S 5/0027* (2013.01); *G06F 1/3212* (2013.01); *G06F 1/3296* (2013.01); *G06Q 50/26* (2013.01); *G08B 21/0258* (2013.01); *G08B 21/0269* (2013.01); *G08B 21/0288* (2013.01); *G08B 21/182* (2013.01); *G08B 21/22* (2013.01); *G08B 21/24* (2013.01); *G08B 25/10* (2013.01); *H04L 67/22* (2013.01); *H04L 67/36* (2013.01); *H04W 4/021* (2013.01); *H04W 4/029* (2018.02); *H04W 52/028* (2013.01); *H04W 52/0277* (2013.01); *G01S 2205/002* (2013.01); *G01S 2205/008* (2013.01)

(58) Field of Classification Search
CPC ... A61B 5/0015; A61B 5/0022; A61B 5/0024; A63B 24/0062; G01C 21/3461; G01S 5/0027; G01S 2205/002; G01S 2205/008; G06F 1/3212; G06F 1/3296; G06F 19/3418; G06F 19/3481; G06Q 10/1091; G06Q 50/26; G08B 21/0258; G08B 21/0269; G08B 21/0288; G08B 21/0453; G08B 21/182; G08B 21/22; G08B 21/24; G08B 25/016; G08B 25/10; G08C 17/02; H04L 67/22; H04L 67/36; H04M 1/72577; H04W 4/021; H04W 4/029; H04W 52/0277; H04W 52/028
USPC ...................................... 340/539.19
See application file for complete search history.

(56) References Cited

U.S. PATENT DOCUMENTS

| | | |
|---|---|---|
| 4,724,427 A | 2/1988 | Carroll |
| 5,731,757 A | 3/1998 | Layson |

(Continued)

FOREIGN PATENT DOCUMENTS

| | | |
|---|---|---|
| WO | WO/1998/08204 | 2/1998 |
| WO | WO/2000/077688 | 12/2000 |

*Primary Examiner* — Stephen R Burgdorf
(74) *Attorney, Agent, or Firm* — HDC IP Law, LLP

(57) ABSTRACT

Various embodiments provide systems and methods for encouraging progress toward a lower level of monitoring for a monitored individual.

26 Claims, 10 Drawing Sheets

(51) Int. Cl.
*H04L 29/08* (2006.01)
*G08B 21/24* (2006.01)
*G01C 21/34* (2006.01)
*G01S 5/00* (2006.01)
*G06F 1/3212* (2019.01)
*G06F 1/3296* (2019.01)
*G08B 21/18* (2006.01)
*H04W 52/02* (2009.01)
*H04W 4/021* (2018.01)

(56) References Cited

U.S. PATENT DOCUMENTS

| | | |
|---|---|---|
| 6,130,620 A | 10/2000 | Pinnow |
| 6,169,484 B1 | 1/2001 | Schuman |
| 6,323,773 B1 | 11/2001 | Runyon |
| 6,393,362 B1 | 5/2002 | Burns |
| 6,437,696 B1 * | 8/2002 | Lemelson .......... G08B 21/0233 340/573.4 |
| 7,015,817 B2 | 3/2006 | Copley |
| 7,619,533 B2 | 11/2009 | Crucilla |
| 7,886,648 B2 | 2/2011 | Williams |
| 7,905,832 B1 * | 3/2011 | Lau .................... G06F 11/3013 600/300 |
| 7,930,927 B2 | 4/2011 | Cooper |
| 8,352,111 B2 | 1/2013 | Mudalige |
| 8,493,219 B2 | 7/2013 | Buck |
| 8,576,065 B2 | 11/2013 | Buck |
| 8,629,776 B2 | 1/2014 | Buck |
| 8,952,805 B2 | 2/2015 | Baines et al. |
| 9,240,118 B2 | 1/2016 | Melton |
| 9,355,548 B2 | 5/2016 | Buck |
| 9,423,487 B2 | 8/2016 | Buck |
| 9,629,420 B2 | 4/2017 | Cooper |
| 9,668,095 B1 | 5/2017 | Newell |
| 10,068,462 B2 | 3/2018 | Buck |
| 9,989,649 B2 | 6/2018 | Buck |
| 2003/0222781 A1 | 12/2003 | Defant et al. |
| 2005/0040944 A1 | 2/2005 | Contestabile |
| 2007/0014264 A1 | 1/2007 | Davis |
| 2007/0285258 A1 | 12/2007 | Hartman |
| 2008/0012760 A1 | 1/2008 | Derrick |
| 2008/0018459 A1 | 1/2008 | Derrick |
| 2010/0253506 A1 * | 10/2010 | Teran-Matus ...... G08B 13/2462 340/539.13 |
| 2011/0154887 A1 | 6/2011 | Cooper |
| 2011/0195722 A1 | 8/2011 | Walter et al. |
| 2011/0199205 A1 * | 8/2011 | Kreml .................. A61B 5/1118 340/539.11 |
| 2011/0237726 A1 | 9/2011 | Dhuna |
| 2013/0328678 A1 | 12/2013 | Shechtner |
| 2014/0039804 A1 * | 2/2014 | Park ...................... A61B 5/0002 702/19 |
| 2014/0179342 A1 * | 6/2014 | Hamerly ............... H04W 4/025 455/456.1 |
| 2015/0123766 A1 | 5/2015 | St. John |
| 2015/0356261 A1 * | 12/2015 | Brust ................... G06F 3/0481 705/2 |
| 2016/0066864 A1 * | 3/2016 | Frieder ................ A61B 5/6898 600/300 |
| 2016/0154643 A1 | 6/2016 | Zhang |
| 2016/0267770 A1 | 9/2016 | Keays |
| 2016/0301581 A1 * | 10/2016 | Carter .................. H04L 43/024 |
| 2016/0310065 A1 * | 10/2016 | Arif ..................... A61B 5/4566 |
| 2017/0134249 A1 * | 5/2017 | Laing ................... H04L 43/065 |
| 2017/0224517 A1 | 8/2017 | Doyle et al. |
| 2017/0303090 A1 | 10/2017 | Stitt |
| 2017/0307388 A1 | 10/2017 | McConathy |
| 2018/0140241 A1 * | 5/2018 | Hamalainen .......... A61B 5/165 |
| 2018/0176727 A1 * | 6/2018 | Williams ............... A61B 5/747 |
| 2018/0224517 A1 * | 8/2018 | Ingerson ............... G01C 22/00 |
| 2019/0043285 A1 | 2/2019 | Hodge |
| 2021/0150870 A1 * | 5/2021 | Gandrud ............... A61B 5/1123 |

* cited by examiner

SYSTEMS AND METHODS FOR MONITORED INDIVIDUAL PROGRESSION PROCESSING

CROSS REFERENCE TO RELATED APPLICATION

The present application claims priority to (i.e., is a non-provisional of) U.S. Pat. App. No. 62/612,650 entitled "Systems and Methods for Monitoring Individuals", and filed Jan. 1, 2018 by Buck et al. The entirety of the aforementioned application is incorporated herein by reference for all purposes.

BACKGROUND OF THE INVENTION

Various embodiments provide systems and methods for encouraging progress toward a lower level of monitoring for a monitored individual.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward.

Thus, there exists a need in the art for more advanced approaches, devices and systems for monitoring.

BRIEF SUMMARY OF THE INVENTION

Various embodiments provide systems and methods for encouraging progress toward a lower level of monitoring for a monitored individual.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
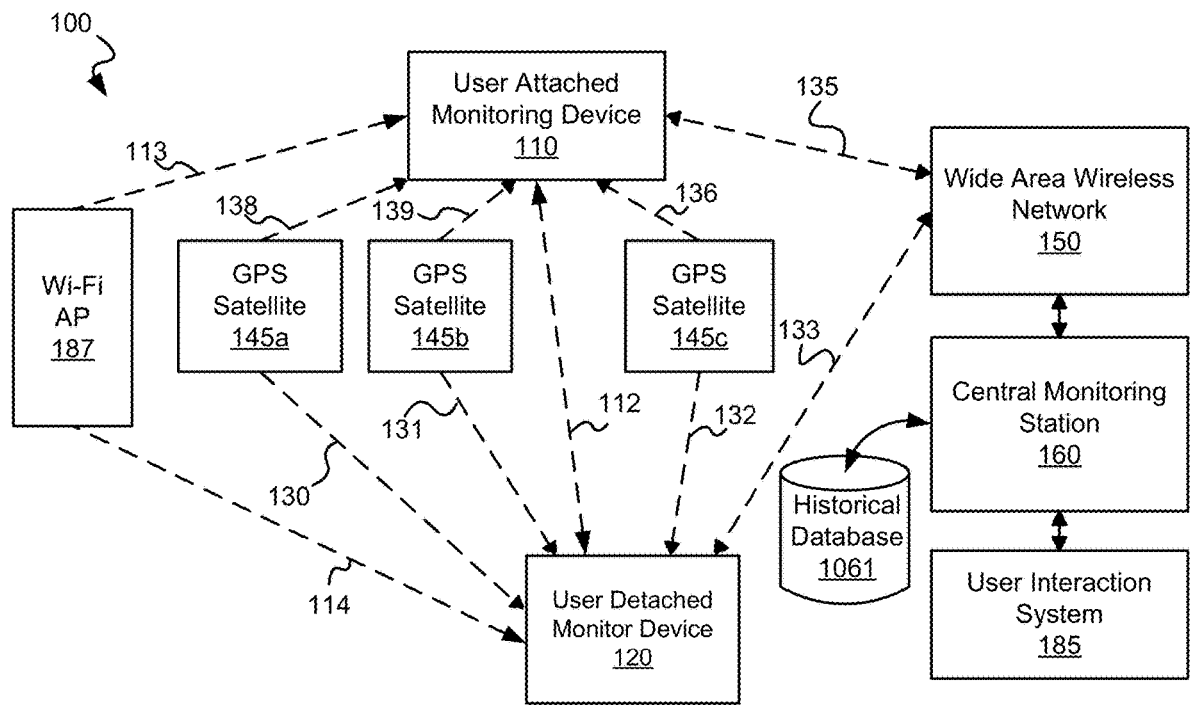
FIG. 1a is a block diagram illustrating a hybrid monitoring system including both a user attached monitor device and a user detached monitor device in accordance with various embodiments.

Various embodiments provide systems and methods for encouraging progress toward a lower level of monitoring for a monitored individual.

It has been found that returning offenders to society after being locked up in a secure facility with little if any control of their day to day activities is often unsuccessful. It is often helpful to have, for example, a parole officer monitor their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provides tools and devices that continue to support the individual as they transition away from the active oversight by, for example, a parole officer.

Various embodiments provide monitoring systems that include a central monitoring station having, inter alia, a computer readable medium and a processor. The computer readable medium includes instructions executable by the processor to: receive a first tracking input from a user attached monitor device securely attached to a monitored individual; store the first tracking input to a historical database where the historical database includes at least a second tracking input received from the user attached monitor device at a time prior to receipt of the first tracking input; and use a combination of at least both the first tracking input and the second tracking input to define a status of the monitored individual. As used herein, the phrase "tracking input" is used in its broadest sense to mean any data received from a tracking device associated with a monitored individual including, but not limited to: a location of a tracking device associated with or attached to a monitored individual, an indication that a tracking device associated with or attached to a monitored individual has been tampered with, an action taken by a monitored individual (e.g., at a particular location at a particular time), an action not taken by a monitored individual (e.g., not at a particular location at a designated time), response of a monitored individual to an instruction provided to the monitored individual, biometric data about the monitored individual, a measured or sensed attribute of a monitored individual, information about an asset tracked by a tracking device, or a measured or sensed attribute of a an asset being monitored.

In some instances of the aforementioned embodiments, the status of the monitored individual is a behavioral trend. In some such instances, the instructions executable by the processor are further executable to: select a message corresponding to the behavioral trend; and transmit the message to a user detached monitor device associated with the monitored individual. In some cases, the user attached monitor device includes a tamper detection circuit operable to indicate an attempt to remove the user attached monitor device from the monitored individual, and the user attached monitor device includes at least one of a display and an audio speaker. The message may be, but is not limited to, a graphical message provided to the monitored individual via the display, an audio message provided to the monitored individual via the audio speaker, or a combination of a graphical message and an audio message provided to the monitored individual via a combination of the display and the audio speaker. In other instances, the behavioral trend is a positive behavioral trend, and the message is selected to reinforce the behavioral trend. In yet other instances, the behavioral trend is a negative behavioral trend, and the message is selected to counter the behavioral trend.

In other instances of the aforementioned embodiments, the status of the monitored individual is an experience exposure, and the instructions executable by the processor are further executable to determine a self-monitoring level for the monitored individual based at least in part on the experience exposure. In some such instances, determining the self-monitoring level for the monitored individual is based at least in part on a combination of the experience exposure and a first behavior of the monitored individual after receiving the first tracking input and a second behavior of the monitored individual after receiving the second tracking input. In some such instances, the instructions executable by the processor are further executable to transmit parameters corresponding to the self-monitoring level to a user detached monitor device associated with the monitored individual. In some cases, at least a subset of the parameters are warning parameters. In various instances, the instructions executable by the processor are further executable to transmit an indication of the self-monitoring level to a user detached monitor device associated with the monitored individual. In one or more instances of the aforementioned embodiments, the instructions executable by the processor are further executable to: determine the occurrence of a violation; determine whether to send a warning of the violation to a user detached monitor device associated with the monitored individual; and transmit the warning of the violation based upon determining to send the warning of the violation.

Other embodiments provide methods for transitioning a monitored individual to a lower level of monitoring. Such methods include: receiving a series of tracking inputs at respective times from a user attached monitor device attached to a monitored individual; storing each of the series of tracking inputs to a historical database; and using a combination of at least two of the series of tracking inputs to define a progress status of the monitored individual.

In some instances of the aforementioned embodiments, the progress status of the monitored individual is a positive behavioral trend, and the method further include: selecting a message to reinforce the positive behavioral trend; and transmitting the message to a user detached monitor device associated with the monitored individual. In various instances of the aforementioned embodiments, the progress status of the monitored individual is a negative behavioral trend, and the method further includdes: selecting a message to instruct the monitored individual in a way to reverse the negative behavioral trend; and transmitting the message to a user detached monitor device associated with the monitored individual.

In various instances of the aforementioned embodiments, the progress status of the monitored individual is an experience exposure. In such instances, the methods further include determining a self-monitoring level for the monitored individual based at least in part on the experience exposure. In some such instances, determining the self-monitoring level for the monitored individual is based at least in part on a combination of the experience exposure and a first behavior of the monitored individual after receiving a first tracking input of the series of tracking inputs and a second behavior of the monitored individual after receiving a second tracking input of the series of tracking inputs. In various such instances, the methods further include transmitting a warning parameter corresponding to the self-monitoring level to a user detached monitor device associated with the monitored individual. In one or more such instances, the methods further include transmitting an indication of the self-monitoring level to a user detached monitor device associated with the monitored individual.

In various instances of the aforementioned embodiments, the methods further include: determining the occurrence of a violation; determining whether to send a warning of the violation to a user detached monitor device associated with the monitored individual; and transmitting the warning of the violation based upon determining to send the warning of the violation.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a BlueTooth™ communication link. In other examples, local communication link 112 may be a line of sight infared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wireless wide area (e.g., cellular telephone network, Internet via a Wi-Fi access point, or the like) communication networks 150.

In some embodiments, central monitoring station 160 is communicably coupled to a historical database 1061. Central monitoring station 160 stores data received from one or both of user attached monitor device 110 and/or user detached monitor device 120. As such, historical database 1061 has a history of a monitored individual including violations, travel locations, and/or any other information about a monitored individual that is received via user attached monitor device 110 and/or user detached monitor device 120.

User detached monitor device 120 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145*a*, 145*b*, 145*c* via respective communication links 130, 131, 132. The aforementioned location data is utilized verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 114.

Central monitoring station 160 preferably comprises a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS satellites 145*a*, 145*b*, 145*c* via respective communication links 136, 138, 139. The aforementioned location data is utilized to verify the location of a user associated with user attached monitor device 110 at various points as more fully discussed below. User attached monitor device 110 is considered "non-ambiguous" because it is physically attached to the user in a tamper resistant way and as such provides information only about the user to which it is attached.

The location data and/or other data gathered by user attached monitor device 110 is wirelessly transmitted to central monitoring station 160 via a wide area wireless network 150 accessed via a wireless link 135. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
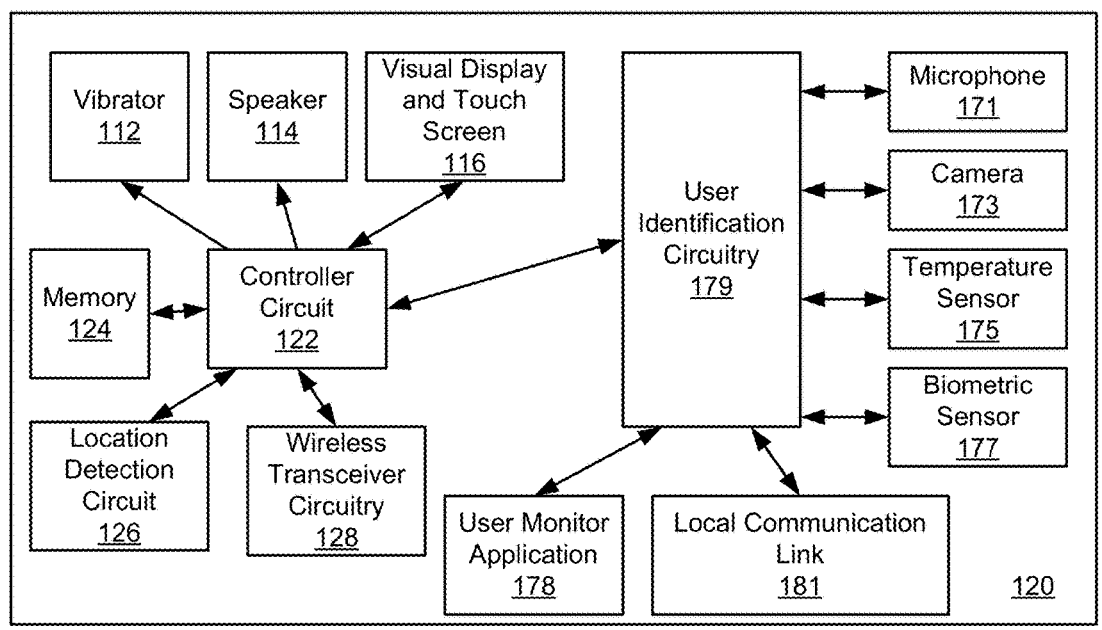
FIG. 1b is a block diagram of a user detached monitor device usable in accordance with one or more embodiments.

Turning to FIG. 1*b*, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software of firmware based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128.

User detached monitor device 120 additionally includes location circuitry 126. Location circuitry 126 may include one or more of, a GPS processing circuit capable of fixing a location of user detached monitor device 120 using GPS data, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a BlueTooth™ communication protocol and is capable of both receiving information from user attached monitor device 110 and transmitting information to user attached monitor device 110. In other embodiments, local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

Figure 1C:
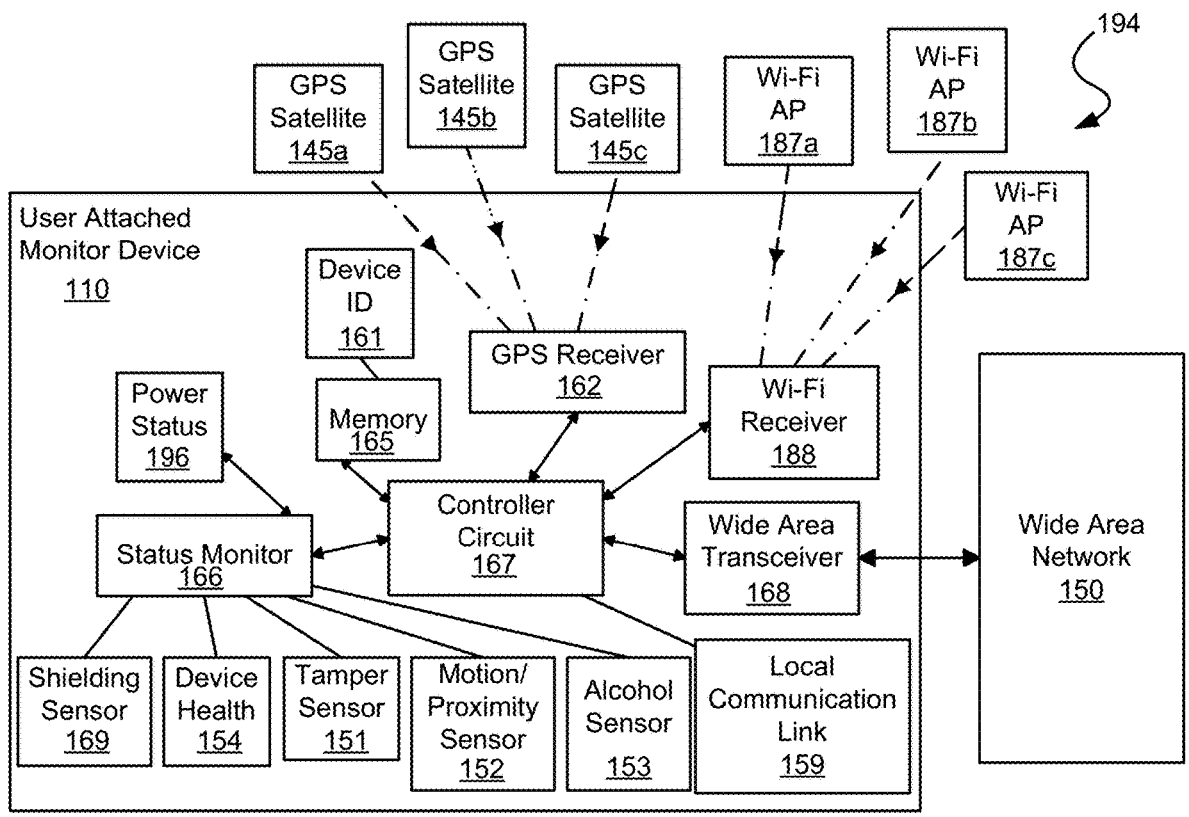
FIG. 1c is a block diagram of a user attached monitor device including a local communication link in accordance with some embodiments.

Turning to FIG. 1c, a block diagram 194 of user attached monitor device 110 including a local communication link 159 in accordance with some embodiments. Local communication link 159 controls communication between user attached monitor device 110 and user detached monitor device 120. In some embodiments, local communication link 159 supports a BlueTooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 110 and transmitting information to user detached monitor device 110. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and thus is accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware based instructions) executable by controller circuit 167 to perform and/or enable various functions associated with user attached monitor device 110. As user attached monitor device 110 comes within range of one or more Wi-Fi access points (e.g., Wi-Fi access points 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a cellular transceiver 168 and a wide area communication network 150 in accordance with a first time period. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from a central monitor system (not shown), or based upon scenarios. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third party service provider resolve the location information. When a maximum number of resolution requests have been issued, the Wi-Fi position determination technology may be disabled. Further, it may be determined the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as cell tower triangulation or GPS may be used.

Controller circuit 167 of user attached monitor device 110 at times functions in conjunction with cellular transceiver 168 to send and receive data and signals through wide area communication network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
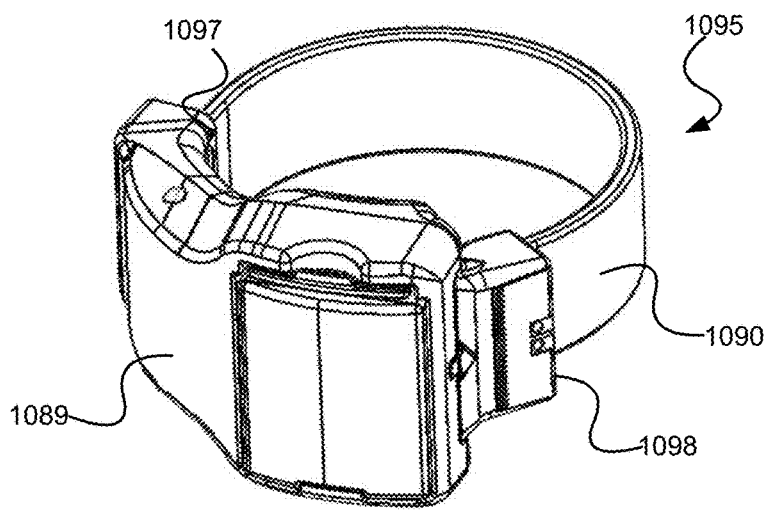
FIG. 1d shows a user attached monitor device with an attachment element for attaching the user attached monitor device to a limb of an individual in accordance with some embodiments.

Turning to FIG. 1*d*, a user attached monitor device 1089 is shown with an example attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments. In various embodiments, attachment element 1090 includes electrically and/or optically conductive material used to make a conductive connection form first end 1097 to second end 1098 through attachment element 1090 and is used in relation to determining whether user attached monitor device 1089 remains attached and/or has been tampered with. While FIG. 1*d* shows a strap as an example attachment element, based upon the disclosure provided herein, one of ordinary skill in the art will recognize other types of attachment elements that may be used in relation to different embodiments.

Figure 2:
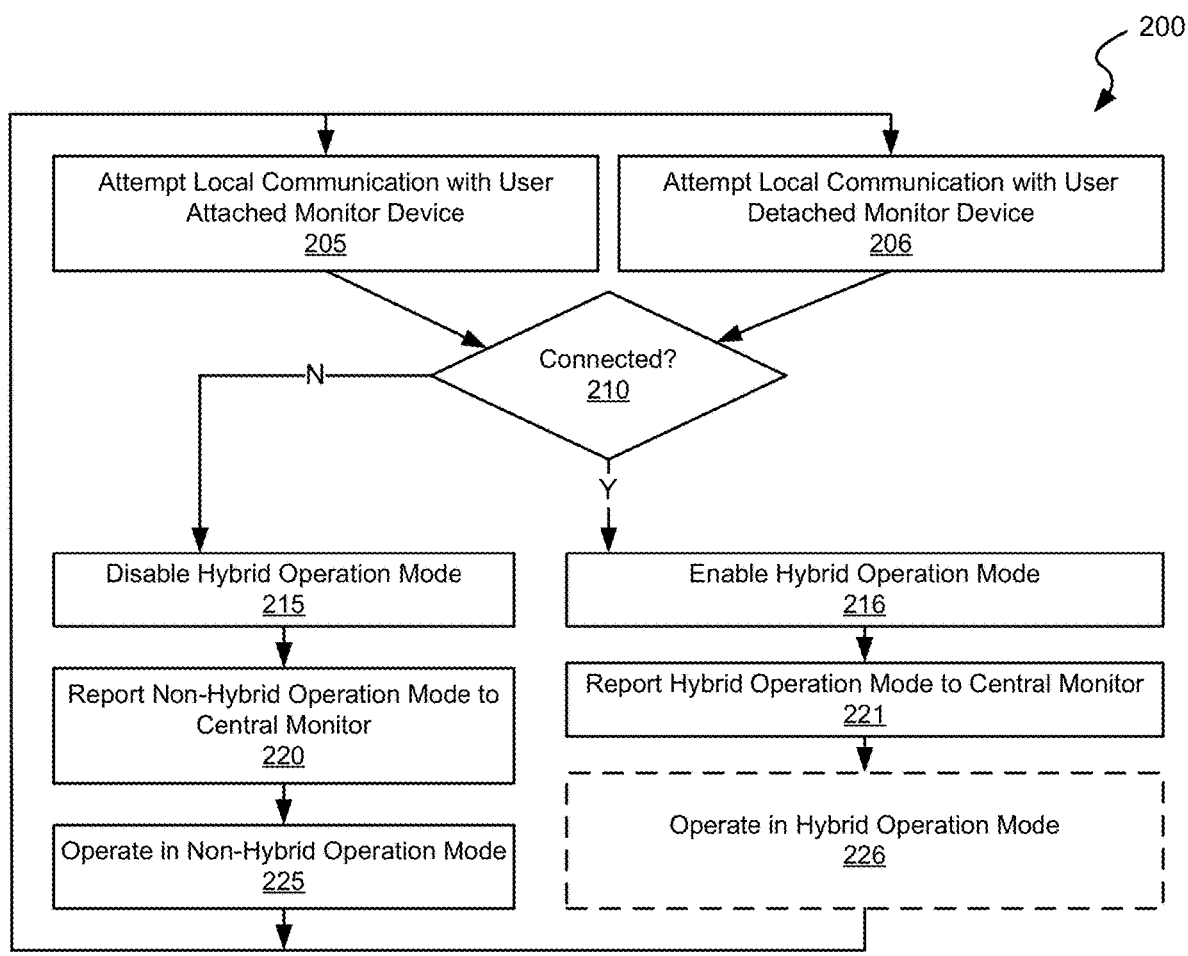
FIG. 2 is a flow diagram showing a method for connecting a user detached monitoring device and a user attached monitoring device using a local communication link, and for changing a mode of operation of a monitoring system based upon the connection in accordance with various embodiments.

Turning to FIG. 2, a flow diagram 200 shows a method for connecting a user detached monitoring device and a user attached monitoring device using a local communication link, and for changing a mode of operation of a monitoring system based upon the connection in accordance with various embodiments. The mode of operation is changed between a non-hybrid operation mode where monitoring is performed exclusively by only one of the user detached monitor device or the user attached monitor device. In certain embodiments, when a connection between a user attached monitor device and a user detached monitor device is not possible, monitoring of an individual is performed exclusively by the user attached monitor device.

Following flow diagram 200, local communication is attempted by the user detached monitor device to the user attached monitor device (block 205). The communication attempt can be sent by one or both of the user attached monitoring device and/or the user detached monitoring device. In some cases, the communication is always attempted by the user detached monitor device to the user attached monitor device (block 205). In such cases, the aforementioned local communication link 181 of the user detached monitor device is used to send a connection request to local communication link 159 of the user attached monitor device. Where the request is accepted by the user attached monitor device, the devices are connected. In some cases, the connection request is a BlueTooth™ communication protocol request. In other cases, the connection request is a Wi-Fi communication protocol request. Based upon the disclosure provided herein, one of ordinary skill in the art will recognize a variety of communication protocol requests that may be used in relation to different embodiments.

In other cases, the communication is always attempted by the user attached monitoring device to the user detached monitor device (block 206). In such cases, the aforementioned local communication link 159 of the user attached monitor device is used to send a connection request to the local communication link 181 of the user detached monitor device. Where the request is accepted by the user detached monitor device, the devices are connected. In certain cases, the communication is attempted by both the user attached monitoring device to the user detached monitor device, and the user detached monitoring device to the user attached monitor device in parallel (block 206). Where either the connection request from the user detached monitor device to the user attached monitor device or the connection request from the user attached monitor device to the user detached monitor device is accepted by the recipient device, the user attached monitor device and the user detached monitor device are considered connected (block 210).

Where the user detached monitor device and the user attached monitor device are considered attached (block 210), hybrid mode operation is enabled (block 216) and the hybrid mode of operation is reported to the central monitor by one or both of the user detached monitor device and/or the user attached monitor device (block 221). Hybrid mode operation allows for use of functionality from a combination of the user attached monitor device and the user detached monitor device (block 226). Such operation in the hybrid mode is shown in dashed lines as there are a large number of combinations of the functionality of the user detached monitor device and the user attached monitor device that may be used in relation to different embodiments. For example, as discussed in more detail below in relation to FIG. 3, where it is determined that the battery in the user attached monitor device is identified the cellular transmitter in the user attached monitor device may be shut down and all cellular communications handled via the user detached monitor device. This may be done, for example, by transferring reporting data from the user attached monitor device to the user detached monitor device (using a combination of local communication link 159 and local communication link 181), and the information transferred to the user detached monitor device is uploaded to a central monitor using the cellular transceiver of the user detached monitor device. Based upon the disclosure provided herein, one of ordinary skill in the art will recognize a variety of combinations of the functionality of the user detached monitor device and the user attached monitor device that may be used in relation to different embodiments.

Alternatively, where the user detached monitor device and the user attached monitor device are not considered attached (block 210), the hybrid mode of operation is disabled (block 215) and the non-hybrid mode of operation is reported to the central monitor by one or the other of the user detached monitor device or the user attached monitor device that attempted to connect to the other but failed to establish a connection (block 220). Non-hybrid mode operation causes both the user attached monitor device and the user detached monitor device to operate as if they are the only monitoring device in operation (block 225).

Figure 3A:
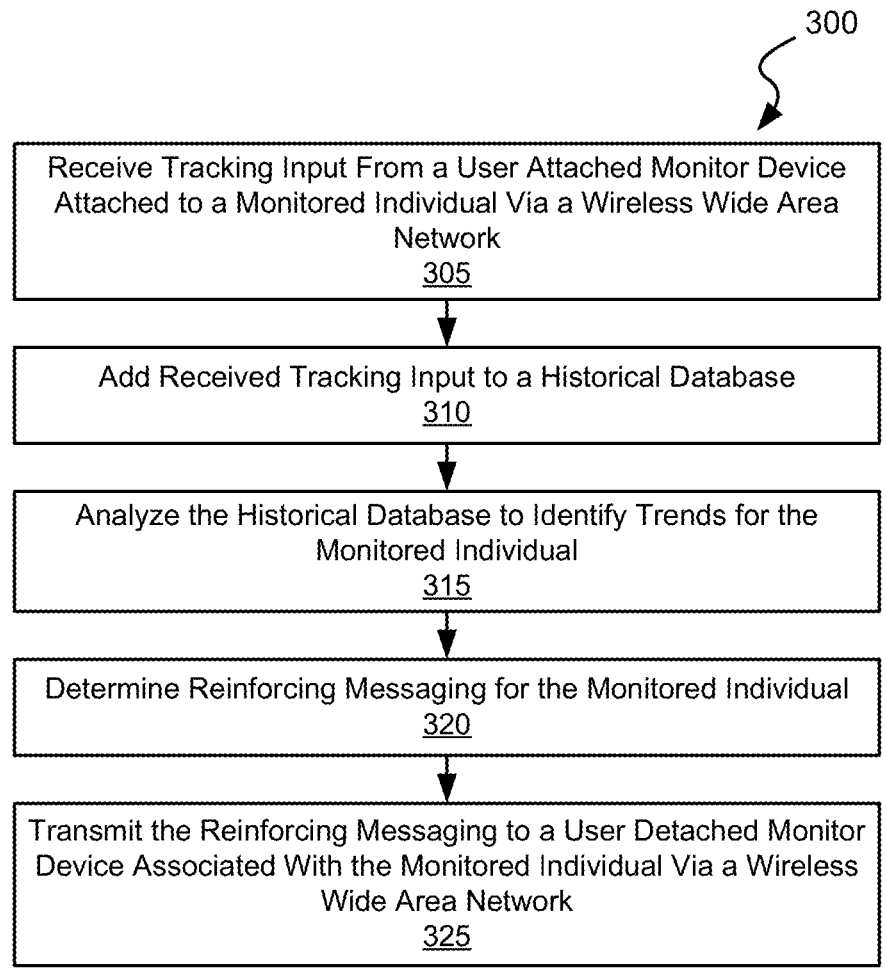
FIGS. 3a-3b are flow diagrams showing methods for providing reinforcement to monitored individuals in accordance with various embodiments.

Turning to FIG. 3a, a flow diagram 300 shows a method for providing reinforcement to a monitored individual in accordance with one or more embodiments. Following flow diagram 300, a tracking input is received from a user attached monitor device that is attached to a monitored individual (block 305). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 310).

The historical database is analyzed to identify one or more trends for the monitored individual (block 315). This analysis may include any use of the data from the historical database to yield a deeper understanding of the monitored individual. For example, the analysis may include, but is not limited to, determining whether a frequency of a certain type of violation is increasing or decreasing. As a more particular example, it may be determined whether a monitored individual that has been identified as having an alcohol problem is going near known bars at an increasing or decreasing rate. As another more particular example, it may be determined whether a monitored individual that has been identified as having a child sexual abuse history is going near locations frequented by children at an increasing or decreasing rate. As another example, the analysis may determine a frequency at which a monitored individual engages in a defined behavior during a defined time period after a reinforcing message is sent to the monitored individual to determine whether the frequency is increasing or decreasing. The identified frequency may be compared with a frequency that occurs when an alternative reinforcing message is used. As a more particular example, it may be determined whether a monitored individual that has been identified as having an alcohol problem is going near known bars at an increasing or decreasing rate within forty eight (48) hours after a positive reinforcing message telling the monitored individual that it has been six (6) weeks since he had an alcohol relapse. As another example using an alternative reinforcing message, it may be determined whether a monitored individual that has been identified as having an alcohol problem is going near known bars at an increasing or decreasing rate within forty eight (48) hours after a negative reinforcing message telling the monitored individual to remember that entering a bar would violate his/her parole resulting in a return to their prior incarcerated state. Based upon the disclosure provided herein, one of ordinary skill in the art will recognize a variety of analysis that may be performed on the data in the historical database to ascertain an understanding of the monitored individual's progress.

Based in part on the analysis of the historical database (block 315), a reinforcing message for the monitored individual may be determined (block 320). Thus, for example, where it has been determined that the monitored individual exhibits a reduced frequency of near violations when a positive reinforcing message is sent in comparison to a frequency exhibited when a negative reinforcing message is sent, a positive reinforcing message may be selected to be sent. Or, in the reverse, where it has been determined that the monitored individual exhibits a reduced frequency of near violations when a negative reinforcing message is sent in comparison to a frequency exhibited when a positive reinforcing message is sent, a negative reinforcing message may be selected to be sent. Based upon the disclosure provided herein, one of ordinary skill in the art will recognize various basis for determining a reinforcing message that may be used in relation to different embodiments.

The determined reinforcing message is then sent to a user detached monitor device associated with the monitored individual via a wireless wide area network (block 325). This reinforcing message is provided to the monitored individual via one or more of the user interfaces included in the user detached monitor device. For example, the reinforcing message may be displayed as a text message or email via a display included in the user detached monitor device. As another example, the reinforcing message may be displayed as a voice and/or video message via a audio speaker and display included in the user detached monitor device. Based upon the disclosure provided herein, one of ordinary skill in the art will recognize a variety of message types and user interfaces that may be used to display the reinforcing message to a monitored individual.

Figure 3B:
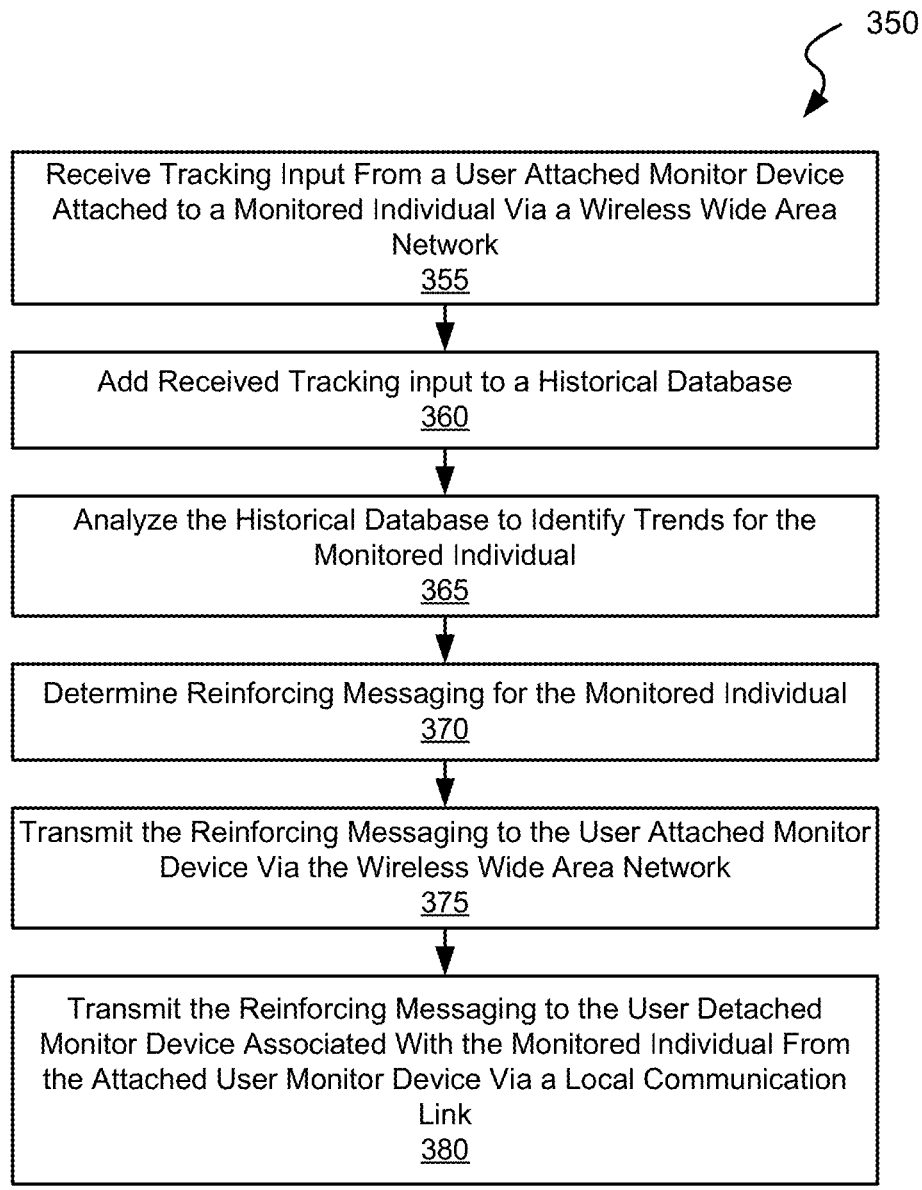

Turning to FIG. 3b, a flow diagram 350 shows another method for providing reinforcement to a monitored individual in accordance with other embodiments. Following flow diagram 350, a tracking input is received from a user attached monitor device that is attached to a monitored individual (block 355). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 360).

The historical database is analyzed to identify one or more trends for the monitored individual (block 365). This analysis may include any use of the data from the historical database to yield a deeper understanding of the monitored individual. For example, the analysis may include, but is not limited to, determining whether a frequency of a certain type of violation is increasing or decreasing. As a more particular example, it may be determined whether a monitored individual that has been identified as having an alcohol problem is going near known bars at an increasing or decreasing rate. As another more particular example, it may be determined whether a monitored individual that has been identified as having a child sexual abuse history is going near locations frequented by children at an increasing or decreasing rate. As another example, the analysis may determine a frequency at which a monitored individual engages in a defined behavior during a defined time period after a reinforcing message is sent to the monitored individual to determine whether the frequency is increasing or decreasing. The identified frequency may be compared with a frequency that occurs when an alternative reinforcing message is used. As a more particular example, it may be determined whether a monitored individual that has been identified as having an alcohol problem is going near known bars at an increasing or decreasing rate within forty eight (48) hours after a positive reinforcing message telling the monitored individual that it has been six (6) weeks since he had an alcohol relapse. As another example using an alternative reinforcing message, it may be determined whether a monitored individual that has been identified as having an alcohol problem is going near known bars at an increasing or decreasing rate within forty eight (48) hours after a negative reinforcing message telling the monitored individual to remember that entering a bar would violate his/her parole resulting in a return to their prior incarcerated state. Based upon the disclosure provided herein, one of ordinary skill in the art will recognize a variety of analysis that may be performed on the data in the historical database to ascertain an understanding of the monitored individual's progress.

Based in part on the analysis of the historical database (block 365), a reinforcing message for the monitored individual may be determined (block 370). Thus, for example, where it has been determined that the monitored individual exhibits a reduced frequency of near violations when a positive reinforcing message is sent in comparison to a frequency exhibited when a negative reinforcing message is sent, a positive reinforcing message may be selected to be sent. Or, in the reverse, where it has been determined that the monitored individual exhibits a reduced frequency of near violations when a negative reinforcing message is sent in comparison to a frequency exhibited when a positive reinforcing message is sent, a negative reinforcing message may be selected to be sent. Based upon the disclosure provided herein, one of ordinary skill in the art will recognize various basis for determining a reinforcing message that may be used in relation to different embodiments.

The determined reinforcing message is then sent to a user attached monitor device attached to the monitored individual via a wireless wide area network (block 375). At some point when a user detached monitor device is within communication range of the user attached monitor device, the reinforcing message is transmitted from the user attached monitor device to the user detached monitor device (block 380). This communication may be done by a local communication link supported by local communication link 159 of the user attached monitor device and local communication link 181 of the user detached monitor device. The reinforcing message is provided to the monitored individual via one or more of the user interfaces included in the user detached monitor device. For example, the reinforcing message may be displayed as a text message or email via a display included in the user detached monitor device. As another example, the reinforcing message may be displayed as a voice and/or video message via a audio speaker and display included in the user detached monitor device. Based upon the disclosure provided herein, one of ordinary skill in the art will recognize a variety of message types and user interfaces that may be used to display the reinforcing message to a monitored individual.

Figure 4A:
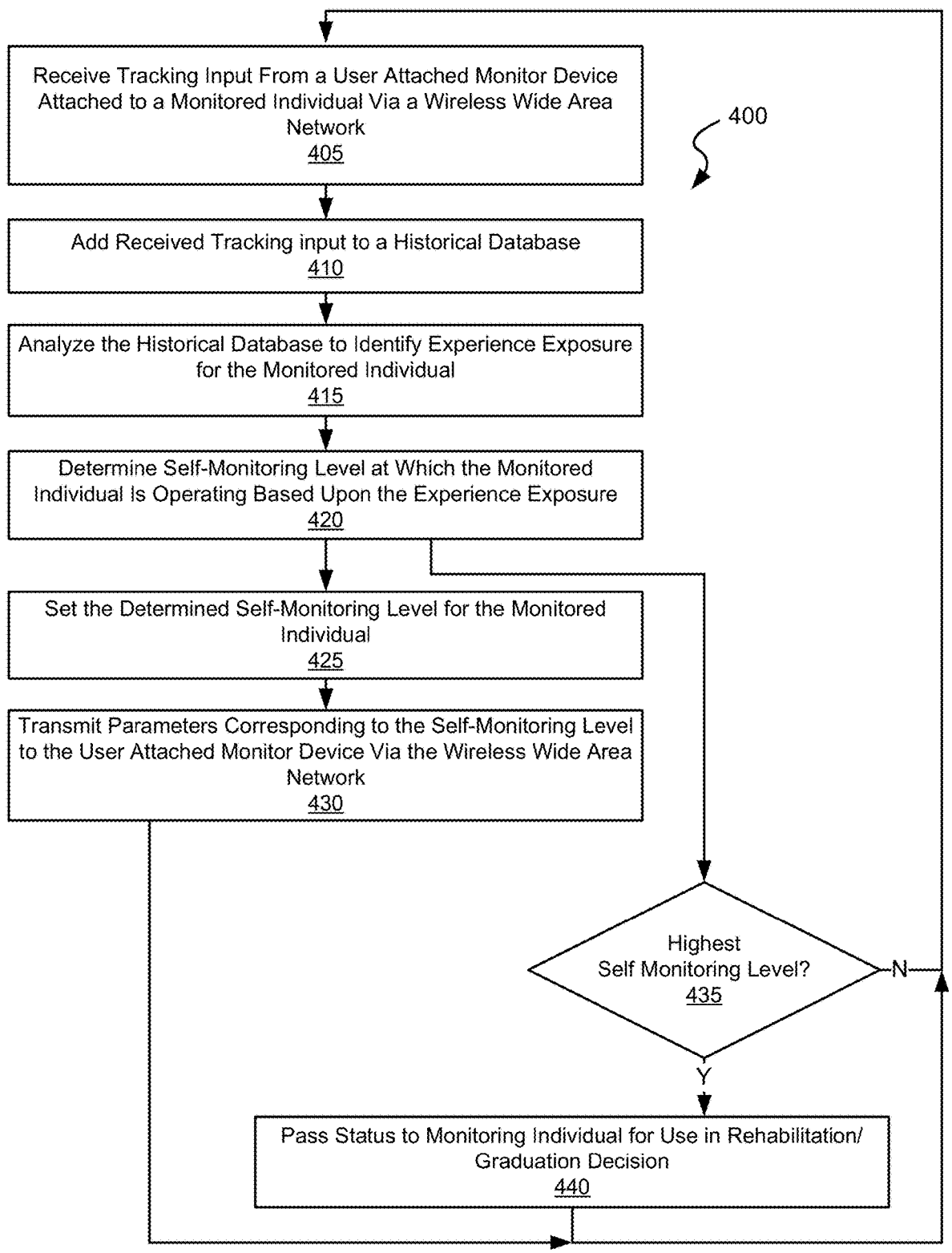
FIGS. 4a-4c are flow diagrams showing methods for providing rehabilitation feedback to one or both of monitored individuals and/or monitoring individuals in accordance with various embodiments.

Turning to FIG. 4a, a flow diagram 400 shows a method for providing rehabilitation feedback to one or both of monitored individuals and/or monitoring individuals in accordance with some embodiments. Following flow diagram 400, a tracking input is received from a user attached monitor device that is attached to a monitored individual (block 405). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 410).

The historical database is analyzed to identify the experience exposure for the monitored individual (block 415). This analysis may include determining how many times and/or how frequently a monitored individual has been exposed to one or more societal elements, and how many of the exposures the monitored individual has reacted poorly. For example, where the monitored individual is identified as a child sex offender, it can be determined how many times the monitored individual has passed within close proximity to a school, a playground, a park, or other location frequented by children at a time in the day when there is a high likelihood that children will be present. Of these exposures, it is determined how often the movement of the monitored individual slowed as they passed through the area when compared with an expected time for traversing the area. As another example, where the monitored individual is identified as having a problem with alcohol, it can be determined how many times the monitored individual has passed within close proximity to a bar or liquor store at a time when the bar or store is opened. Of these exposures, it is determined how often the movement of the monitored individual slowed as they passed through the area of the bar or liquor store when compared with an expected time for traversing the area. Based upon the disclosure provided herein, one of ordinary skill in the art will recognize a variety of analysis that may be performed on the data in the historical database to experience exposure of the monitored individual and/or reaction of the monitored individual to the experience exposure.

Based in part on the analysis of the historical database (block 415), a self-monitoring level for the monitored individual is determined (block 420). This determination of the self-monitoring level may be any process that assigns a level of expected success for the monitored individual when the monitored individual is exposed to societal elements that pose an expected challenge to the monitored individual. Thus, for example, where the monitored individual's progress through a challenging area always slows without explanation, the monitored individual may be assigned a letter D self-monitoring level indicating a higher probability of recidivism. In contrast, where the monitored individual's progress through a challenging area slows without explanation as many times as it does not slow, the monitored individual may be assigned a letter C self-monitoring level indicating a somewhat reduced probability of recidivism. Alternatively, where the monitored individual's progress through a challenging area slows without explanation only occasionally, the monitored individual may be assigned a letter B self-monitoring level indicating a significantly reduced probability of recidivism. As yet another alternative, where the monitored individual's progress through a challenging area never slows, the monitored individual may be assigned a letter A self-monitoring level indicating a low probability of recidivism. Based upon the disclosure provided herein, one of ordinary skill in the art will recognize various basis for determining a self-monitoring level for a monitored individual that may be used in relation to different embodiments.

It is determined whether the monitored individual is consistently operating at the highest self-monitoring level (e.g., letter A self-monitoring level)(block 435). Where the monitored individual is operating at the highest self-monitoring level (block 435), an indication of the current highest self-monitoring level is communicated to a monitoring individual for use in making a rehabilitation/graduation decision (block 440). The monitoring individual may be anyone tasked with making determinations about the progress of a monitored individual. Thus, for example, a monitoring individual may be a parole officer assigned to the monitored individual. The rehabilitation/graduation decision may be any determination made as to whether the monitored individual should be recommended for release from wearing the user attached monitor device and/or any reduction in oversight by the monitoring individual.

In parallel, the determined self-monitoring level (block 420) is set for the monitored individual (block 425). This setting may include, but is not limited to, updating a self-monitoring level field in the historical database related to the monitored individual. Alternatively, or in addition, this setting may include, but is not limited to, updating a self-monitoring level field in a memory of the user attached monitor device attached to the monitored individual. In addition, parameters for the determined self-monitoring level are transmitted to the user attached monitor device via the wireless wide area network (block 430). The parameters may be more rigid where the self-monitoring level for the individual is getting worse (e.g., a transition from a letter B self-monitoring level to a letter C self-monitoring level). In contrast, the parameters may be more relaxed where the self-monitoring level for the individual is getting better (e.g., a transition from a letter C self-monitoring level to a letter B self-monitoring level). As a particular example, more rigid parameters may include more restrictive exclusion zones that further limit areas where the monitored individual is allowed to go. As used herein, an "exclusion zone" is any area or location where an individual associated with the user detached monitor device and/or the user attached monitor device is prohibited and/or discouraged from entering. The exclusion zones may be identified in a number of ways. For example, the exclusion zones may be identified as two opposing corners of a rectangle or a center point and radius of a circle. Based upon the disclosure provided herein, one of ordinary skill in the recognize other approaches that may be used for identifying the boundaries of an exclusion zone. The universe of exclusion zones may be developed, for example, by local area officials to identify the location of different types of zones in a region that they operate. In turn, zone information from a number of local regions may be assembled in a common database to make a wider area map of zones. Exclusion zones may each be identified for different reasons, and may be grouped together with other exclusion zones that share similar characteristics. For example, places where children are present like parks and schools, places where alcohol is prevalent such as bars or night clubs, or the like. Individuals may be precluded from entering one or more types of exclusion zones. Alternatively, more relaxed parameters may include further relaxed exclusion zones that reduce the areas where the monitored individual is allowed not allowed to go. Based upon the disclosure provided herein, one of ordinary skill in the art will recognize a variety of changes to monitoring parameters that may be made and enforced based upon a determined self-monitoring level.

Figure 4B:
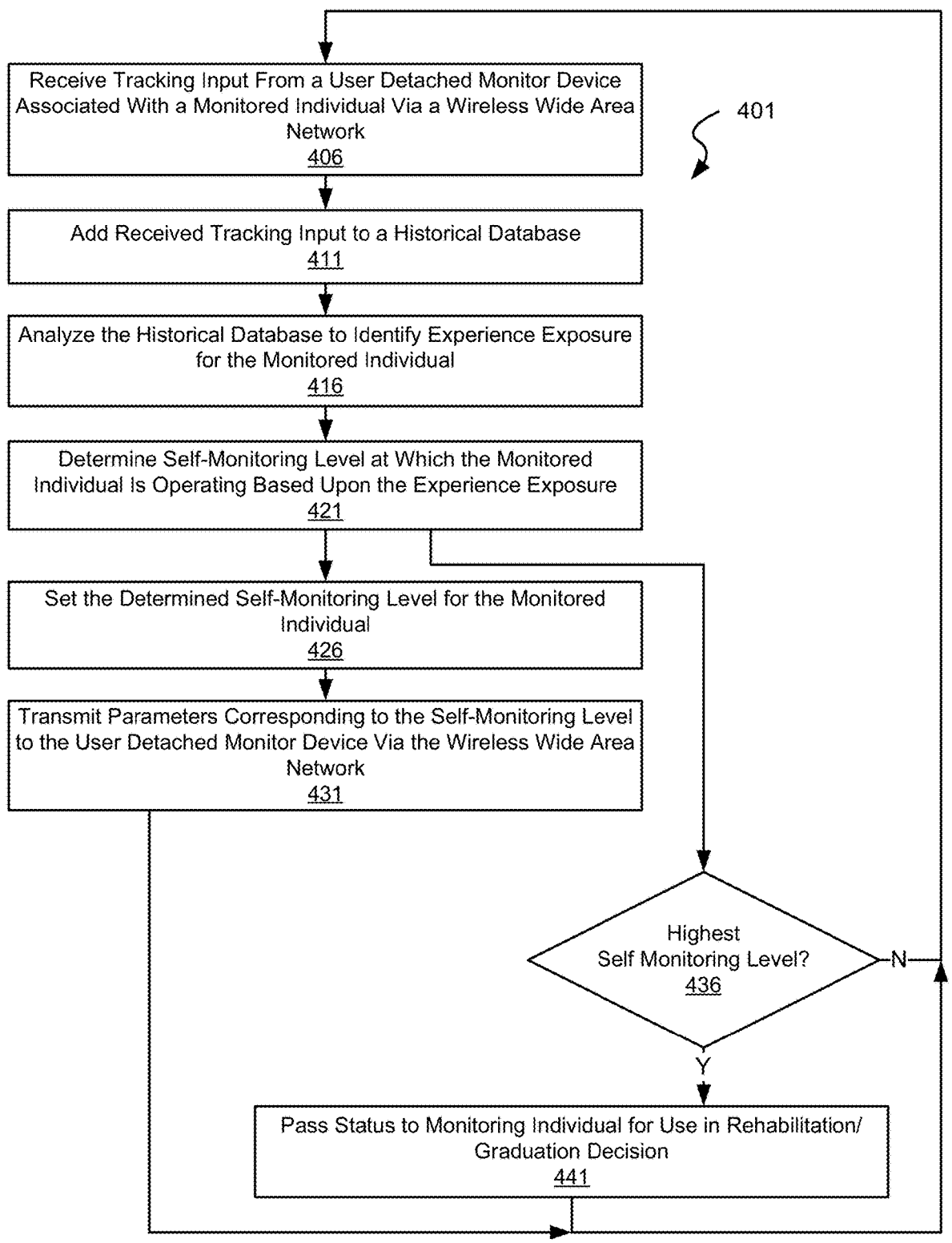

Turning to FIG. 4b, a flow diagram 401 shows another method for providing rehabilitation feedback to one or both of monitored individuals and/or monitoring individuals in accordance with other embodiments. Following flow diagram 401, a tracking input is received from a user detached monitor device that is associated with a monitored individual (block 406). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 411).

The historical database is analyzed to identify the experience exposure for the monitored individual (block 416). This analysis may include determining how many times and/or how frequently a monitored individual has been exposed to one or more societal elements, and how many of the exposures the monitored individual has reacted poorly. For example, where the monitored individual is identified as a child sex offender, it can be determined how many times the monitored individual has passed within close proximity to a school, a playground, a park, or other location frequented by children at a time in the day when there is a high likelihood that children will be present. Of these exposures, it is determined how often the movement of the monitored individual slowed as they passed through the area when compared with an expected time for traversing the area. As another example, where the monitored individual is identified as having a problem with alcohol, it can be determined how many times the monitored individual has passed within close proximity to a bar or liquor store at a time when the bar or store is opened. Of these exposures, it is determined how often the movement of the monitored individual slowed as they passed through the area of the bar or liquor store when compared with an expected time for traversing the area. Based upon the disclosure provided herein, one of ordinary skill in the art will recognize a variety of analysis that may be performed on the data in the historical database to experience exposure of the monitored individual and/or reaction of the monitored individual to the experience exposure.

Based in part on the analysis of the historical database (block 416), a self-monitoring level for the monitored individual is determined (block 421). This determination of the self-monitoring level may be any process that assigns a level of expected success for the monitored individual when the monitored individual is exposed to societal elements that pose an expected challenge to the monitored individual. Thus, for example, where the monitored individual's progress through a challenging area always slows without explanation, the monitored individual may be assigned a letter D self-monitoring level indicating a higher probability of recidivism. In contrast, where the monitored individual's progress through a challenging area slows without explanation as many times as it does not slow, the monitored individual may be assigned a letter C self-monitoring level indicating a somewhat reduced probability of recidivism. Alternatively, where the monitored individual's progress through a challenging area slows without explanation only occasionally, the monitored individual may be assigned a letter B self-monitoring level indicating a significantly reduced probability of recidivism. As yet another alternative, where the monitored individual's progress through a challenging area never slows, the monitored individual may be assigned a letter A self-monitoring level indicating a low probability of recidivism. Based upon the disclosure provided herein, one of ordinary skill in the art will recognize various basis for determining a self-monitoring level for a monitored individual that may be used in relation to different embodiments.

It is determined whether the monitored individual is consistently operating at the highest self-monitoring level (e.g., letter A self-monitoring level)(block 436). Where the monitored individual is operating at the highest self-monitoring level (block 436), an indication of the current highest self-monitoring level is communicated to a monitoring individual for use in making a rehabilitation/graduation decision (block 441). The monitoring individual may be anyone tasked with making determinations about the progress of a monitored individual. Thus, for example, a monitoring individual may be a parole officer assigned to the monitored individual. The rehabilitation/graduation decision may be any determination made as to whether the monitored individual should be recommended for release from using the user detached monitor device and/or any reduction in oversight by the monitoring individual.

In parallel, the determined self-monitoring level (block 421) is set for the monitored individual (block 426). This setting may include, but is not limited to, updating a self-monitoring level field in the historical database related to the monitored individual. Alternatively, or in addition, this setting may include, but is not limited to, updating a self-monitoring level field in a memory of the user detached monitor device associated with the monitored individual. In addition, parameters for the determined self-monitoring level are transmitted to the user detached monitor device via the wireless wide area network (block 431). The parameters may be more rigid where the self-monitoring level for the individual is getting worse (e.g., a transition from a letter B self-monitoring level to a letter C self-monitoring level). In contrast, the parameters may be more relaxed where the self-monitoring level for the individual is getting better (e.g., a transition from a letter C self-monitoring level to a letter B self-monitoring level). As a particular example, more rigid parameters may include more restrictive exclusion zones that further limit areas where the monitored individual is allowed to go.

Figure 4C:
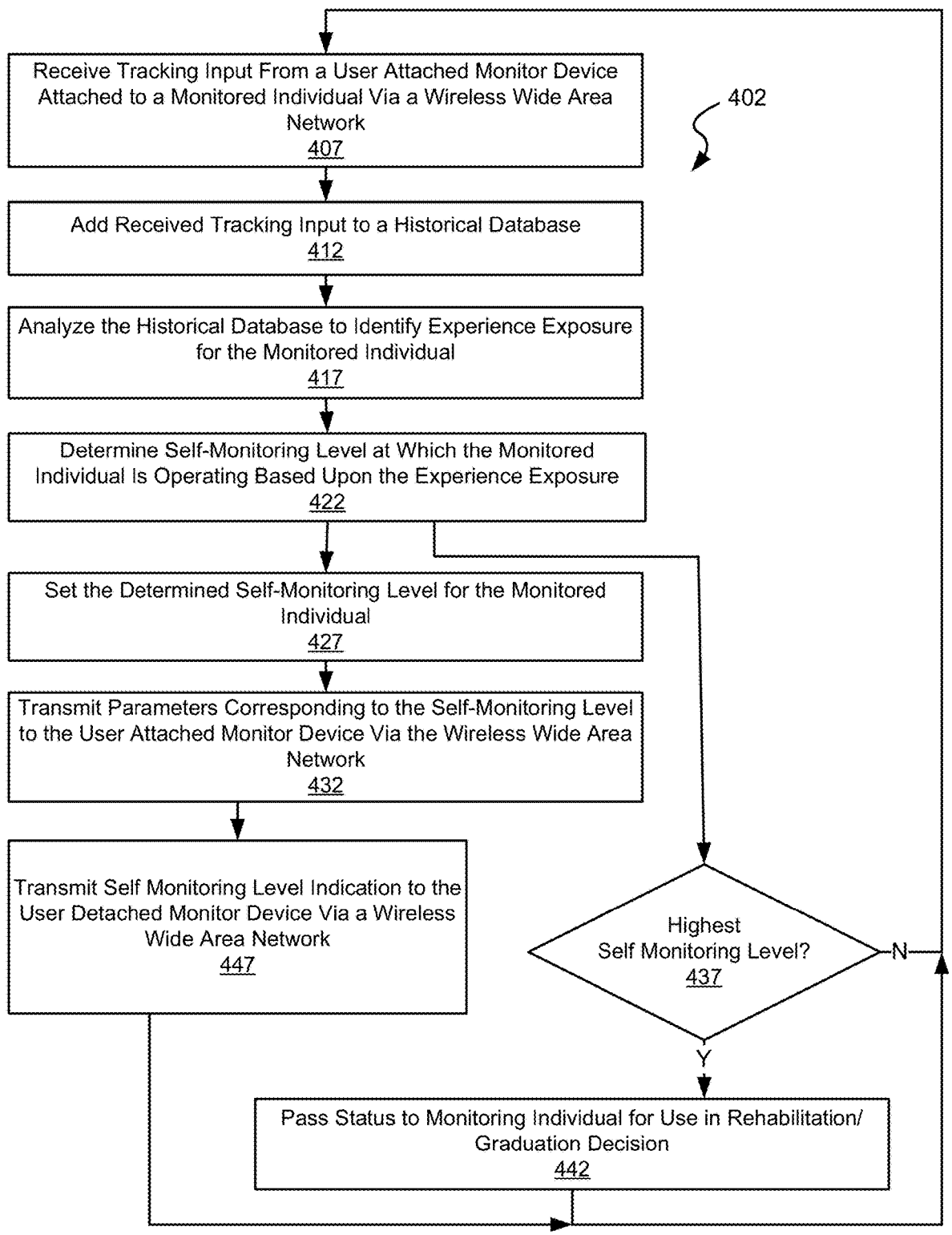

Turning to FIG. 4c, a flow diagram 402 shows another method for providing rehabilitation feedback to one or both of monitored individuals and/or monitoring individuals in accordance with yet other embodiments. Following flow diagram 402, a tracking input is received from a user attached monitor device that is attached to a monitored individual (block 407). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 412).

The historical database is analyzed to identify the experience exposure for the monitored individual (block 417). This analysis may include determining how many times and/or how frequently a monitored individual has been exposed to one or more societal elements, and how many of the exposures the monitored individual has reacted poorly. For example, where the monitored individual is identified as a child sex offender, it can be determined how many times the monitored individual has passed within close proximity to a school, a playground, a park, or other location frequented by children at a time in the day when there is a high likelihood that children will be present. Of these exposures, it is determined how often the movement of the monitored individual slowed as they passed through the area when compared with an expected time for traversing the area. As another example, where the monitored individual is identified as having a problem with alcohol, it can be determined how many times the monitored individual has passed within close proximity to a bar or liquor store at a time when the bar or store is opened. Of these exposures, it is determined how often the movement of the monitored individual slowed as they passed through the area of the bar or liquor store when compared with an expected time for traversing the area. Based upon the disclosure provided herein, one of ordinary skill in the art will recognize a variety of analysis that may be performed on the data in the historical database to experience exposure of the monitored individual and/or reaction of the monitored individual to the experience exposure.

Based in part on the analysis of the historical database (block 417), a self-monitoring level for the monitored individual is determined (block 422). This determination of the self-monitoring level may be any process that assigns a level of expected success for the monitored individual when the monitored individual is exposed to societal elements that pose an expected challenge to the monitored individual. Thus, for example, where the monitored individual's progress through a challenging area always slows without explanation, the monitored individual may be assigned a letter D self-monitoring level indicating a higher probability of recidivism. In contrast, where the monitored individual's progress through a challenging area slows without explanation as many times as it does not slow, the monitored individual may be assigned a letter C self-monitoring level indicating a somewhat reduced probability of recidivism. Alternatively, where the monitored individual's progress through a challenging area slows without explanation only occasionally, the monitored individual may be assigned a letter B self-monitoring level indicating a significantly reduced probability of recidivism. As yet another alternative, where the monitored individual's progress through a challenging area never slows, the monitored individual may be assigned a letter A self-monitoring level indicating a low probability of recidivism. Based upon the disclosure provided herein, one of ordinary skill in the art will recognize various basis for determining a self-monitoring level for a monitored individual that may be used in relation to different embodiments.

It is determined whether the monitored individual is consistently operating at the highest self-monitoring level (e.g., letter A self-monitoring level)(block 437). Where the monitored individual is operating at the highest self-monitoring level (block 437), an indication of the current highest self-monitoring level is communicated to a monitoring individual for use in making a rehabilitation/graduation decision (block 442). The monitoring individual may be anyone tasked with making determinations about the progress of a monitored individual. Thus, for example, a monitoring individual may be a parole officer assigned to the monitored individual. The rehabilitation/graduation decision may be any determination made as to whether the monitored individual should be recommended for release from wearing the user attached monitor device and/or any reduction in oversight by the monitoring individual.

In parallel, the determined self-monitoring level (block 422) is set for the monitored individual (block 427). This setting may include, but is not limited to, updating a self-monitoring level field in the historical database related to the monitored individual. Alternatively, or in addition, this setting may include, but is not limited to, updating a self-monitoring level field in a memory of the user attached monitor device attached to the monitored individual. In addition, parameters for the determined self-monitoring level are transmitted to the user attached monitor device via the wireless wide area network (block 432). The parameters may be more rigid where the self-monitoring level for the individual is getting worse (e.g., a transition from a letter B self-monitoring level to a letter C self-monitoring level). In contrast, the parameters may be more relaxed where the self-monitoring level for the individual is getting better (e.g., a transition from a letter C self-monitoring level to a letter B self-monitoring level). As a particular example, more rigid parameters may include more restrictive exclusion zones that further limit areas where the monitored individual is allowed to go.

The self-monitoring level is transmitted to a user detached monitor device associated with the individual being monitored (block 447). This information may be displayed to the monitored individual associated with the user attached monitor device as a reinforcing message to encourage the monitored individual to keep progressing to higher self-monitoring levels (e.g., toward letter A self-monitoring level), and/or to discourage the monitored individual from regressing to lower self-monitoring levels (e.g., away from letter A self-monitoring level). In some cases, the reinforcing message may indicate a reason for the most recent change in self-monitoring levels.

Figure 5:
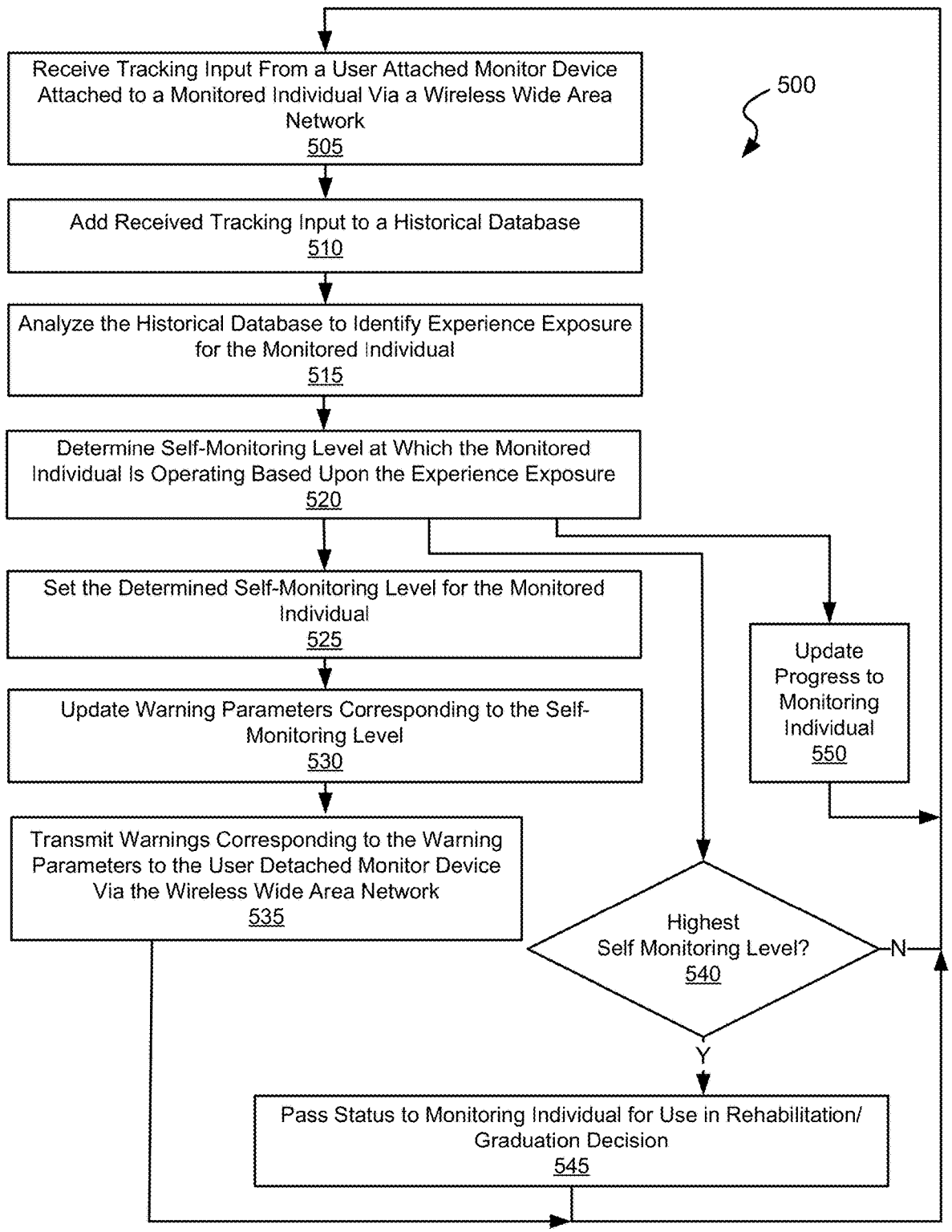
FIG. 5 is a flow diagram showing methods for monitoring monitored individual exposure to various experiences and graduating them through levels toward a determination of in accordance with some embodiments.

Turning to FIG. 5, a flow diagram 500 shows a method for monitoring monitored individual exposure to various experiences and graduating them through levels toward a determination of in accordance with some embodiments. Following flow diagram 500, a tracking input is received from a user attached monitor device that is attached to a monitored individual (block 505). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 510).

The historical database is analyzed to identify the experience exposure for the monitored individual (block 515). This analysis may include determining how many times and/or how frequently a monitored individual has been exposed to one or more societal elements, and how many of the exposures the monitored individual has reacted poorly. For example, where the monitored individual is identified as a child sex offender, it can be determined how many times the monitored individual has passed within close proximity to a school, a playground, a park, or other location frequented by children at a time in the day when there is a high likelihood that children will be present. Of these exposures, it is determined how often the movement of the monitored individual slowed as they passed through the area when compared with an expected time for traversing the area. As another example, where the monitored individual is identified as having a problem with alcohol, it can be determined how many times the monitored individual has passed within close proximity to a bar or liquor store at a time when the bar or store is opened. Of these exposures, it is determined how often the movement of the monitored individual slowed as they passed through the area of the bar or liquor store when compared with an expected time for traversing the area. Based upon the disclosure provided herein, one of ordinary skill in the art will recognize a variety of analysis that may be performed on the data in the historical database to experience exposure of the monitored individual and/or reaction of the monitored individual to the experience exposure.

Based in part on the analysis of the historical database (block 415), a self-monitoring level for the monitored individual is determined (block 520). This determination of the self-monitoring level may be any process that assigns a level of expected success for the monitored individual when the monitored individual is exposed to societal elements that pose an expected challenge to the monitored individual. Thus, for example, where the monitored individual's progress through a challenging area always slows without explanation, the monitored individual may be assigned a letter D self-monitoring level indicating a higher probability of recidivism. In contrast, where the monitored individual's progress through a challenging area slows without explanation as many times as it does not slow, the monitored individual may be assigned a letter C self-monitoring level indicating a somewhat reduced probability of recidivism. Alternatively, where the monitored individual's progress through a challenging area slows without explanation only occasionally, the monitored individual may be assigned a letter B self-monitoring level indicating a significantly reduced probability of recidivism. As yet another alternative, where the monitored individual's progress through a challenging area never slows, the monitored individual may be assigned a letter A self-monitoring level indicating a low probability of recidivism. Based upon the disclosure provided herein, one of ordinary skill in the art will recognize various basis for determining a self-monitoring level for a monitored individual that may be used in relation to different embodiments.

Any change in the self-monitoring level is uploaded to a monitoring individual (block 550). This upload may be from a central monitoring station to an electronic device associated with the monitoring individual. The monitoring individual may be anyone tasked with making determinations about the progress of a monitored individual. Thus, for example, a monitoring individual may be a parole officer assigned to the monitored individual.

It is determined whether the monitored individual is consistently operating at the highest self-monitoring level (e.g., letter A self-monitoring level)(block 540). Where the monitored individual is operating at the highest self-monitoring level (block 540), an indication of the current highest self-monitoring level is communicated to a monitoring individual for use in making a rehabilitation/graduation decision (block 545). The rehabilitation/graduation decision may be any determination made as to whether the monitored individual should be recommended for release from wearing the user attached monitor device and/or any reduction in oversight by the monitoring individual.

In parallel, the determined self-monitoring level (block 520) is set for the monitored individual (block 525). This setting may include, but is not limited to, updating a self-monitoring level field in the historical database related to the monitored individual. Alternatively, or in addition, this setting may include, but is not limited to, updating a self-monitoring level field in a memory of the user attached monitor device attached to the monitored individual.

Warning parameters for the determined self-monitoring level are transmitted to the user attached monitor device via the wireless wide area network (block 530). Such warning parameters correspond to activities that will trigger communication to the monitored individual via a user detached monitor device. Thus, for example, in a lower self-monitoring level (e.g., letter C self-monitoring level), a great deal of messaging may be provided to the user detached monitor device in an effort to guide or train the monitored individual. In contrast, when a higher self-monitoring level is determined, fewer messages of guidance or reinforcement are provided to the monitored individual. As a monitored individual continues to operate in the current self-monitoring level, warnings allowed for the particular level are transmitted from a central monitoring station to the user attached monitor device associated with the monitored individual via a wireless wide area network (block 535). Thus, for example when the monitored individual lingers near a problematic area (e.g., a bar or a school), a message may be sent to encourage the monitored individual to move along. Based upon the disclosure provided herein, one of ordinary skill in the art will recognize a variety of warnings that may be issued based upon information being received from the user attached monitor device, and/or types of warning or frequency of warnings that are supported in each self-monitoring level.

Figure 6:
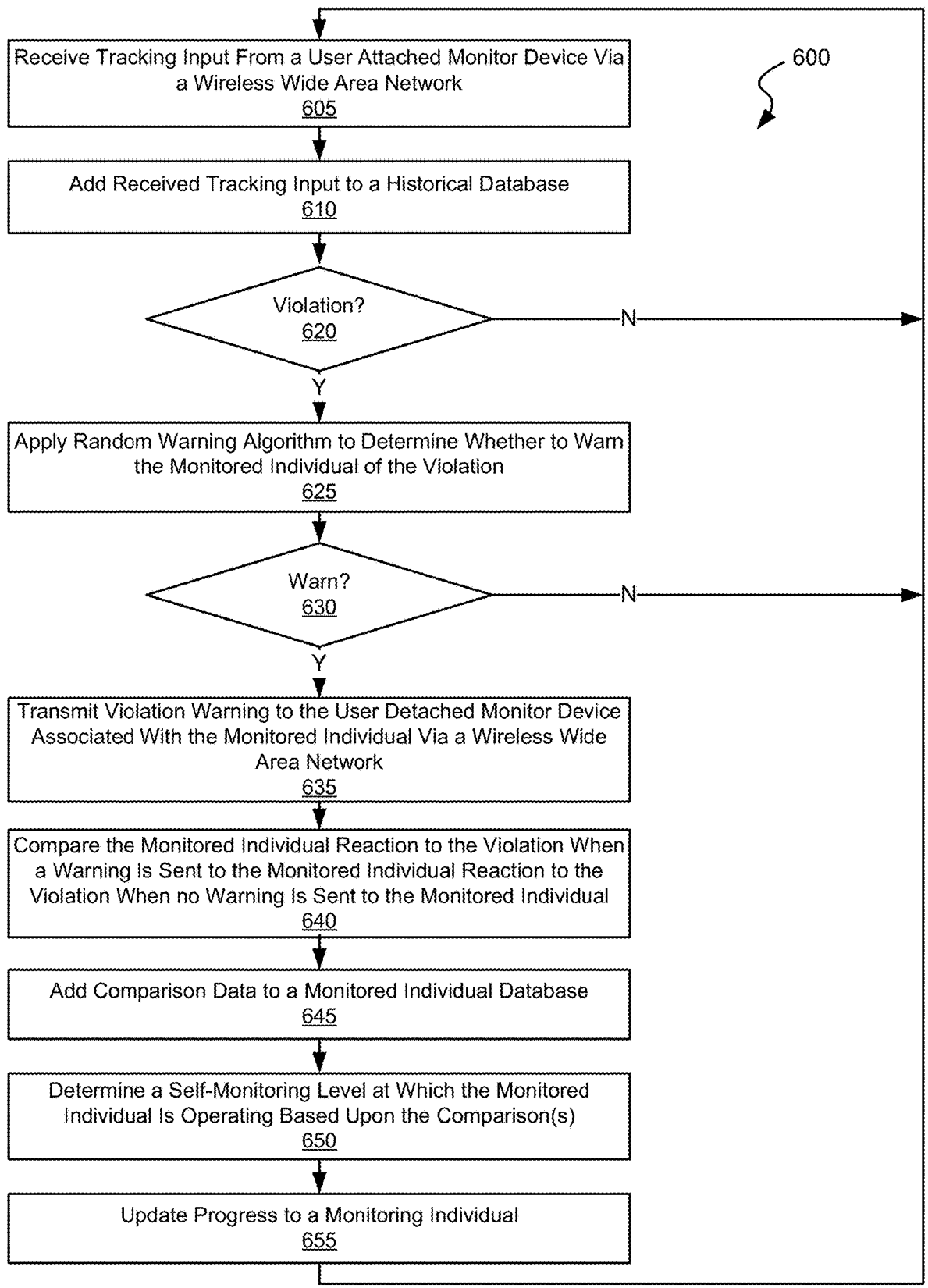
FIG. 6 is a flow diagram showing methods for maintaining constant monitoring parameters (e.g., exclusion zone alerts), but varying warnings provided to a monitored individual in accordance with some embodiments.

Turning to FIG. 6, a flow diagram 600 shows a method for maintaining constant monitoring parameters (e.g., exclusion zone alerts), but varying warnings provided to a monitored individual in accordance with some embodiments. Following flow diagram 600, a tracking input is received from a user attached monitor device that is attached to a monitored individual (block 605). The tracking input may be received via a wireless wide area network. In some cases, the tracking input is received at a central monitoring station 160 that maintains a historical database 1061. Historical database 1061 maintains data received from one or both of user attached monitor device 110 and/or user detached monitor device 120. As such, historical database 1061 may include, but is not limited to, a history of a monitored individual associated with the user attached monitor device 110 and/or the user detached monitor device 120. Such data may include, but is not limited to, violations, travel locations, prior reinforcing messages sent to the monitored individual, reactions to prior reinforcing messages by the monitored individual, self-monitoring level of the monitored individual, warning parameters associated with the self-monitoring level, and/or random algorithm seed for the monitored individual. Based upon the disclosure provided herein, one of ordinary skill in the art will recognize a variety of data that may be maintained in historical database 1061. The received tracking input is stored to the historical database (block 610).

It is determined whether the information received from the user attached monitor device indicates a violation (block 620). Such a violation may be indicated for example, where the location of the user attached monitor device is within an exclusion zone, the information indicates some attempt to tamper with the user attached monitor device, or the like. Based upon the disclosure provided herein, one of ordinary skill in the art will recognize a variety of violations that may be indicated based upon information used from the user attached monitor device.

Where it is determined that a violation has occurred (block 620), a warning algorithm is applied to determine whether the monitored individual is to be warned of the violation or whether the violation will not be shared with the monitored individual (block 625). The algorithm may be relatively simple such as one where, for example, a warning is only sent to the monitored individual every third violation that is received. More ornate algorithms may be employed that provide a maximum of one warning during any given period of time regardless of how many violations are detected during the period. Thus, when a warning is provided to the monitored individual, no other warning will be provided for at least a set period of time. As yet another example, a pseudorandom number generator may be used where a warning is provided to the monitored individual only when an even number is provided from the pseudo random number generator. Based upon the disclosure provided herein, one of ordinary skill in the art will recognize a variety of warning algorithms that may be used in relation to different embodiments.

It is determined whether the warning algorithm indicated a warning was to be sent to the monitored individual (block 630). Where a warning is to be issued to the monitored individual (block 630), the warning is transmitted to a user detached monitor device associated with the monitored individual via a wireless wide area network (block 635). The warning is designed to educate the monitored individual on why a violation was generated, and to provide instructions on how to resolve the current violation, and/or to provide instructions on how to avoid generating the violation in the future. For example, where the violation is a tamper alert, the warning may instruct the monitored individual to call on how to resolve the current alert may include an instruction to call the monitoring individual in charge to both receive further instructions on how to resolve the violation and to explain the activity the monitored individual was engaged in that triggered the violation and why the monitored individual was engaged in such activity. Alternatively, where for example the violation is an exclusion zone violation, the instructions on how to resolve the current violation may include step by step instructions for a path that is to be taken to move out of the exclusion zone, and the instructions on how to avoid generating the violation in the future may request origin and destination information from the monitored individual followed by directions for a path that can be used in the future which would not generate a violation. The warning is displayed to the monitored individual using one or more user interfaces of the user detached monitor device.

Information received from the user attached monitor device is used to determine how the monitored individual is reacting to the provided warning, and that reaction is compared with prior reactions where the monitored individual was not provided a warning (block 640). Using an exclusion zone violation as an example, where a warning is sent to a monitored individual via the user detached monitor device, the data received from the user attached monitor device is used to determine whether the monitored individual followed the provided instructions and how much delay there was in following the instructions. The time it took to follow the instructions is then compared with a time period required to resolve similar exclusion zone violations. The comparison data is then added to the historical database along with other data about the monitored individual (block 645).

in the historical database including the comparison data to determine a self-monitoring level for the monitored individual (block 650). This determination of the self-monitoring level may be any process that assigns a level of expected success for the monitored individual when the monitored individual is given queues such as warnings to avoid further problems.

Any change in the self-monitoring level is uploaded to a monitoring individual (block 655). This upload may be from a central monitoring station to an electronic device associated with the monitoring individual. The monitoring individual may be anyone tasked with making determinations about the progress of a monitored individual. Thus, for example, a monitoring individual may be a parole officer assigned to the monitored individual.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
   a monitoring station including a computer readable medium and a processor, wherein the computer readable medium includes instructions executable by the processor to:
   receive a first tracking input from a user attached monitor device attached to a monitored individual wherein the first tracking input includes data selected from a group consisting of: a violation, and a geographic location; wherein the user attached monitor device includes a tamper detection circuit operable to indicate an attempt to remove the user attached monitor device from the monitored individual, and wherein the user attached monitor device includes at least one of a display and an audio speaker;
   store the first tracking input to a historical database, wherein the historical database includes at least a second tracking input corresponding to the monitored individual at a time prior to receipt of the first tracking input;
   use a first combination of data including the first tracking input and the second tracking input to define a level of expected success for the monitored individual when the monitored individual is exposed to societal elements, wherein determining the level of expected success for the monitored individual is based at least in part on a combination of an exposure to a geographic location including a societal element and a change in a rate of movement after exposure to the geographic location;
   establish a geographical limit for the monitored individual based at least in part on the level of expected success for the monitored individual;
   use a second combination of data including the first tracking input and the second tracking input to define a behavioral trend of the monitored individual;
   select a message corresponding to the behavioral trend; and
   transmit the message to a user detached monitor device associated with the monitored individual; and
      transmit the geographical limit to the user attached monitor device, wherein the user attached monitor device is configured to automatically compare the geographical limit with a location of the user attached monitor device.

2. The monitoring system of claim 1, wherein the message is selected from a group consisting of: a graphical message provided to the monitored individual via the display, an audio message provided to the monitored individual via the audio speaker, and a combination of a graphical message and an audio message provided to the monitored individual via a combination of the display and the audio speaker.

3. The monitoring system of claim 1, wherein the behavioral trend is a positive behavioral trend, and wherein the message is selected to reinforce the behavioral trend.

4. The monitoring system of claim 1, wherein the level of expected success for the monitored individual is reduced from a prior level, and wherein the geographical limit reduces a range of allowed movement of the monitored individual.

5. The monitoring system of claim 1, wherein the level of expected success for the monitored individual is increased from a prior level, and wherein the geographical limit increases a range of allowed movement of the monitored individual.

6. The monitoring system of claim 1, wherein the instructions executable by the processor are further executable to:
transmit an indication of the level of expected success for the monitored individual to a user detached monitor device associated with the monitored individual.

7. The monitoring system of claim 1, wherein the instructions executable by the processor are further executable to:
determine the occurrence of a violation;
determine whether to send a warning of the violation to a user detached monitor device associated with the monitored individual; and
transmit the warning of the violation based upon determining to send the warning of the violation.

8. The monitoring system of claim 1, wherein the user attached monitor device is continuously attached and operating during the time between when the first tracking input and the second tracking input are received from the user attached monitor device.

9. The monitoring system of claim 1, wherein the status of the monitored individual is selected from a group consisting of: a frequency of a violation, a frequency of a violation after a message is provided to the monitored individual, a frequency of travel near a proscribed location type, and a frequency of travel near a proscribed location after a message is provided to the monitored individual.

10. The monitoring system of claim 1, wherein the societal elements include at least one element selected from a group consisting of: a location frequented by children, and a location selling alcohol.

11. The monitoring system of claim 1, wherein the first combination of data is the same as the second combination of data.

12. A monitoring system, the monitoring system comprising:
a first monitoring device, wherein the first monitoring device is: configured to be attached to a monitored individual, includes a tamper detection circuit configured to indicate an attempt to remove the first monitoring device from the monitored individual, and includes at least one of a display and an audio speaker;
a second monitoring device including a computer readable medium and a processing resource, wherein the computer readable medium has stored therein instructions that when executed by the processing resource cause the processing resource to:
receive a first tracking input from the first monitoring device;
store the first tracking input to a historical database, wherein the historical database includes at least a second tracking input corresponding to the monitored individual at a time prior to receipt of the first tracking input;
use a first combination of data including the first tracking input and the second tracking input to define a level of expected success for the monitored individual based at least in part on a combination of an exposure to a geographic location including a societal element and a change in a rate of movement after exposure to the geographic location;
establish a geographical limit for the monitored individual based at least in part on the level of expected success for the monitored individual;
use a second combination of data including the first tracking input and the second tracking input to define a behavioral trend of the monitored individual;
select a message corresponding to the behavioral trend; and
transmit the geographical limit to the first monitoring device, wherein the first monitoring device is configured to automatically compare the geographical limit with a location of the first monitoring device.

13. The monitoring system of claim 12, wherein the first monitoring user attached monitor device is continuously attached and operating during the time between when the first tracking input and the second tracking input are received from the first monitoring device.

14. The monitoring system of claim 12, wherein the first combination of data is the same as the second combination of data.

15. A method for transitioning a monitored individual to a lower level of monitoring, the method comprising:
receiving, by a second monitoring device, at least a first tracking input from a first monitoring device, wherein the first tracking device is: attached to a monitored individual, includes a tamper detection circuit configured to indicate an attempt to remove the first monitor device from the monitored individual, and includes at least one of a display and an audio speaker;
storing, by the second monitoring device, the first tracking input to a historical database, wherein the historical database includes at least a second tracking input corresponding to the monitored individual at a time prior to receipt of the first tracking input;
using, by the second monitoring device, a first combination of data including the first tracking input and the second tracking input to define a level of expected success for the monitored individual based at least in part on a combination of an exposure to a geographic location including a societal element and a change in a rate of movement after exposure to the geographic location;
establishing, by the second monitoring device, a geographical limit for the monitored individual based at least in part on the level of expected success for the monitored individual;
using, by the second monitoring device, a second combination of data including the first tracking input and the second tracking input to define a behavioral trend of the monitored individual;
selecting, by the second monitoring device, a message corresponding to the behavioral trend; and
transmitting, by the second monitoring device, the geographical limit to the first monitoring device, wherein the first monitoring device is configured to automatically compare the geographical limit with a location of the first monitoring device.

16. The method of claim 15, wherein the societal element is selected from a group consisting of: a location frequented by children, and a location selling alcohol.

17. The method of claim 15, wherein the message is selected from a group consisting of: a graphical message provided to the monitored individual via the display, an audio message provided to the monitored individual via the audio speaker, and a combination of a graphical message and an audio message provided to the monitored individual via a combination of the display and the audio speaker.

18. The method of claim 15, wherein the behavioral trend is a positive behavioral trend, and wherein the message is selected to reinforce the behavioral trend.

19. The method of claim 15, wherein the level of expected success for the monitored individual is reduced from a prior level, and wherein the geographical limit update reduces a range of allowed movement of the monitored individual.

20. The method of claim 15, wherein the level of expected success for the monitored individual is increased from a prior level, and wherein the geographical limit update increases a range of allowed movement of the monitored individual.

21. The method of claim 15, the method further comprising:
transmitting, by the second monitoring device, an indication of the level of expected success for the monitored individual to a user detached monitor device associated with the monitored individual.

22. The method of claim 15, wherein the first combination of data is the same as the second combination of data.

23. The method of claim 15, the method further comprising:
determining, by the second monitoring device, the occurrence of a violation;
determining, by the second monitoring device, whether to send a warning of the violation to a user detached monitor device associated with the monitored individual; and
transmitting, by the second monitoring device, the warning of the violation based upon determining to send the warning of the violation.

24. The method of claim 15, wherein the monitored individual is not alerted to the defining of expected success for the monitored individual.

25. The method of claim 15, wherein the level of expected success corresponds to a progress status of the monitored individual that is a positive behavioral trend, and wherein the method further comprises:
selecting a message to reinforce the positive behavioral trend; and
transmitting the message to a user detached monitor device associated with the monitored individual.

26. The method of claim 25, wherein the level of expected success corresponds to a progress status of the monitored individual that is a negative behavioral trend, and wherein the method further comprises:
selecting a message to instruct the monitored individual in a way to reverse the negative behavioral trend; and
transmitting the message to a user detached monitor device associated with the monitored individual.

* * * * *